(12) United States Patent
Tajiri

(10) Patent No.: US 11,102,527 B2
(45) Date of Patent: Aug. 24, 2021

(54) VIDEO DISTRIBUTION APPARATUS, VIDEO RECEPTION APPARATUS, VIDEO DISTRIBUTION METHOD, AND RECORDING MEDIUM

(71) Applicant: CANON KABUSHIKI KAISHA, Tokyo (JP)

(72) Inventor: Katsutoshi Tajiri, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/938,529

(22) Filed: Mar. 28, 2018

(65) Prior Publication Data

US 2018/0295401 A1    Oct. 11, 2018

(30) Foreign Application Priority Data

Apr. 7, 2017 (JP) .............................. JP2017-076652

(51) Int. Cl.
| | |
|---|---|
| *H04N 21/845* | (2011.01) |
| *H04N 21/2343* | (2011.01) |
| *H04N 5/232* | (2006.01) |
| *H04N 21/438* | (2011.01) |
| *H04N 21/262* | (2011.01) |
| *H04N 21/6379* | (2011.01) |
| *H04N 21/437* | (2011.01) |
| *H04N 21/643* | (2011.01) |
| *H04N 21/235* | (2011.01) |

(52) U.S. Cl.
CPC . *H04N 21/234345* (2013.01); *H04N 5/23206* (2013.01); *H04N 21/23439* (2013.01); *H04N 21/26258* (2013.01); *H04N 21/4381* (2013.01); *H04N 21/6379* (2013.01); *H04N 21/8456* (2013.01); *H04N 21/2353* (2013.01); *H04N 21/437* (2013.01); *H04N 21/64322* (2013.01)

(58) Field of Classification Search
CPC .................................................... H04N 21/845
See application file for complete search history.

(56) References Cited

U.S. PATENT DOCUMENTS

| | | | | |
|---|---|---|---|---|
| 10,007,843 | B1 * | 6/2018 | Letourneur | G06K 9/00469 |
| 2013/0114744 | A1 * | 5/2013 | Mutton | H04L 65/601 |
| | | | | 375/240.26 |
| 2013/0124683 | A1 * | 5/2013 | Watanabe | H04N 21/4622 |
| | | | | 709/217 |

(Continued)

FOREIGN PATENT DOCUMENTS

| | | |
|---|---|---|
| CN | 101534433 A | 9/2009 |
| CN | 102196008 A | 9/2011 |

(Continued)

*Primary Examiner* — Michael H Hong

(74) *Attorney, Agent, or Firm* — Canon U.S.A., Inc. IP Division

(57) ABSTRACT

A video distribution apparatus includes a holding unit configured to hold a captured video image in a predetermined unit, a reception unit configured to receive a request regarding a segment length which is transmitted from an external reception apparatus, a generation unit configured to generate from the predetermined unit held by the holding unit a segment of the video image of the segment length corresponding to the request received by the reception unit, and a distribution unit configured to distribute to the reception apparatus the segment generated by the generation unit.

8 Claims, 11 Drawing Sheets

(56) References Cited

U.S. PATENT DOCUMENTS

2017/0078687 A1\* 3/2017 Coward ............... H04N 19/395

FOREIGN PATENT DOCUMENTS

| CN | 102356622 A | 2/2012 |
| CN | 102427507 A | 4/2012 |
| CN | 102789804 A | 11/2012 |
| CN | 103546828 A | 1/2014 |
| CN | 103648019 A | 3/2014 |
| CN | 103905924 A | 7/2014 |
| CN | 103984483 A | 8/2014 |
| CN | 104253999 A | 12/2014 |
| CN | 104349221 A | 2/2015 |
| CN | 104904225 A | 9/2015 |
| CN | 105430425 A | 3/2016 |
| CN | 106331788 A | 1/2017 |
| JP | 2017-069636 A | 4/2017 |
| WO | 2014/010501 A1 | 1/2014 |

\* cited by examiner

VIDEO DISTRIBUTION APPARATUS, VIDEO RECEPTION APPARATUS, VIDEO DISTRIBUTION METHOD, AND RECORDING MEDIUM

BACKGROUND OF THE INVENTION

Field of the Invention

The present invention relates to a video distribution apparatus, a video distribution method, and a recording medium.

Description of the Related Art

In recent years, the Internet is developed, and network cameras which distribute in real time video images captured with, for example, cameras using Internet Protocol (IP) networks are used. The distribution of such video images is used to, for example, prevent crime in offices, commercial facilities, etc. or monitor situations in leisure facilities, such as ski areas and zoos.

The distribution of video images by the network cameras uses protocols, such as the Real-time Transport Protocol (RTP). RTP, however, has issues with data not being delivered to a destination reception apparatus depending on a network environment and that the reception apparatus is required to include an RTP-compatible application, preventing RTP from becoming popular.

Meanwhile, there are standards for video distribution, such as the Dynamic Adaptive Streaming over Hyper Text Transfer Protocol (HTTP) (DASH), which is standardized by the Moving Picture Experts Group (MPEG), and HTTP Live Streaming (HLS). These standards are adaptive bitrate streaming techniques using HTTP, and such video distribution techniques are increasingly used.

The adaptive bitrate streaming techniques overcome the above-described issues with RTP and enable reception and reproduction of video images on normal browsers. For example, in general DASH distribution, a transmission server divides a plurality of pieces of video data of different resolutions or bitrates into video files called "segments" of several-second units. A client sequentially downloads the divided segments to reproduce the video files. Specifically, the client first acquires a Media Presentation Description (MPD) file, which describes entire information about the video images, and selects a video stream of an appropriate resolution or bitrate from the MPD file. Then, the client downloads and reproduces video data of MPEG-2 transport stream (TS) or MPEG-4 (MP-4) file on a segment basis according to the description of the MPD file.

International Publication WO/2014/010501 discusses a reproduction apparatus which includes a segment conversion unit and a control information conversion unit. The segment conversion unit converts a large number of segments having a short time length and forming a live broadcast program into a fewer number of segments having a long time length for recording and reproducing images and stores the fewer number of segments in a storage unit. Further, the control information conversion unit converts control information containing information for the reproduction of the large number of segments into control information containing information for the reproduction of the fewer number of segments.

In moving image distribution services using the adaptive bitrate streaming techniques described above, if the segment time is reduced, the client needs to acquire the segments again and again to continuously reproduce video images. In view of the processing load of the segment acquisition, the segments are normally generated in several-second to ten-and-several-second units. In this case, the client is unable to download data for several seconds to ten and several seconds until the first segment is completely generated in live distribution, and this causes a distribution delay.

Meanwhile, the tolerance with respect to the distribution delay can differ among a plurality of clients for example in the live video distribution of a network camera. For example, the client that is only for viewing video images allows distribution delays to some extent but demands for a reduced number of downloads to perform smooth reproduction. In this case, it is desirable to distribute long segments to the client.

On the other hand, for example, the client that prioritizes real-time performance, such as the client that performs camera control, etc. demands for reduced distribution delays even if the number of downloads increases. In this case, it is desirable to distribute short segments to the client.

However, for example, an embedded device, such as a network camera, normally has low central processing unit (CPU) performance and limited memory capacity. Thus, it has been difficult for such an embedded device to prepare a plurality of types of video files of different segment times in accordance with a plurality of different requests from a plurality of clients.

SUMMARY OF THE INVENTION

The present invention is directed to a video distribution apparatus capable of distributing video images as appropriate by, for example, having the following configuration.

According to an aspect of the present invention, a video distribution apparatus includes a holding unit configured to hold a captured video image in a predetermined unit, a reception unit configured to receive a request regarding a segment length which is transmitted from an external reception apparatus, a generation unit configured to generate from the predetermined unit held by the holding unit a segment of the video image of the segment length corresponding to the request received by the reception unit, and a distribution unit configured to distribute to the reception apparatus the segment generated by the generation unit.

Further features of the present invention will become apparent from the following description of exemplary embodiments with reference to the attached drawings.

DESCRIPTION OF THE EMBODIMENTS

Figure 1:
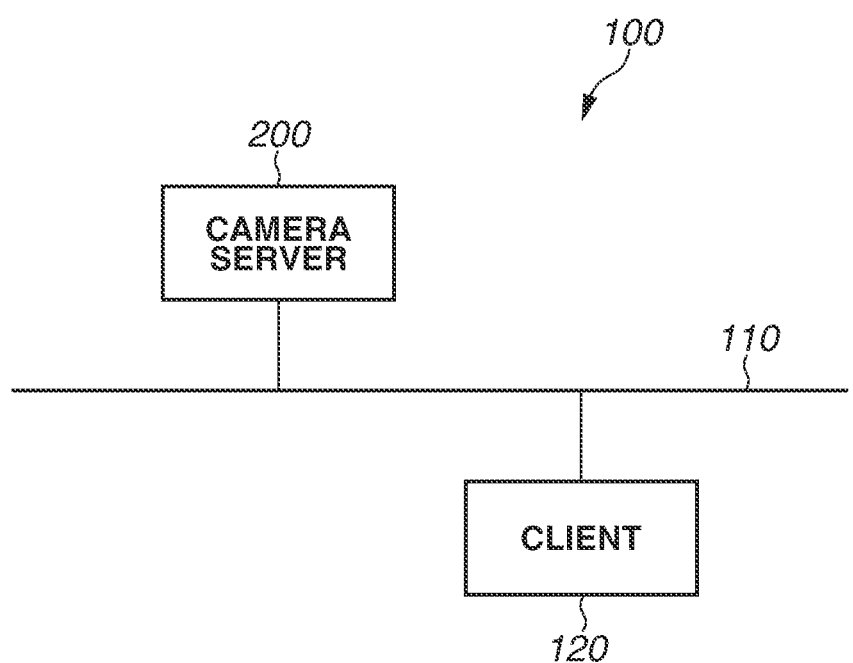
FIG. 1 schematically illustrates the configuration of a video distribution system according to the disclosure.

Various exemplary embodiments of the present invention will be described in detail below with reference to the accompanying drawings. It should be noted that the exemplary embodiments described below are mere examples of implementations and are to be modified or changed as appropriate according to the configuration of an apparatus to which the present invention is applied or various conditions and are not intended to limit the scope of the invention. Further, similar elements are given the same reference numerals, and redundant description thereof is omitted.
(Configuration of Video System)

FIG. 1 schematically illustrates an example of the configuration of a video distribution system 100 according to the disclosure. As illustrated in FIG. 1, the video distribution system 100 includes a camera server 200 and a client 120. The camera server 200 is a video distribution apparatus, and the client 120 is a reception apparatus. The camera server 200 and the client 120 are connected to each other via a network 110. The camera server 200 includes a camera (image capturing device) and distributes captured video images to the client 120 via the network 110. The video distribution system 100 is capable of performing, for example, video distribution in accordance with Dynamic Adaptive Streaming over Hyper Text Transfer Protocol (HTTP) (DASH), which is standardized by the Moving Picture Experts Group (MPEG), HTTP Live Streaming (HLS), etc. Specifically, the video distribution system 100 is capable of performing video distribution using an adaptive bitrate streaming technique with HTTP.

The client 120 accesses the camera server 200 via the network 110 to acquire video images to be distributed from the camera server 200. In the present exemplary embodiment, the term "distribution" refers to not only the transmission to a plurality of clients (reception apparatuses) but also the transmission to only a single client.

The network 110 is a communication network and includes a plurality of routers, switches, cables, etc. which follow a communication standard such as Ethernet. Alternatively, the network 110 may be configured with a different communication network, such as the Internet, a local area network (LAN), or a public wireless network. While one camera server 200 and one client 120 are illustrated in FIG. 1 to simplify the description, the video distribution system 100 may include one camera server 200 and a plurality of clients 120, a plurality of camera servers 200 and one client 120, or a plurality of camera servers 200 and a plurality of clients 120. Furthermore, in the present exemplary embodiment, the communication standard, scale, and configuration of the communication network between the camera server 200 and the client 120 can be selected freely.

Figure 2:
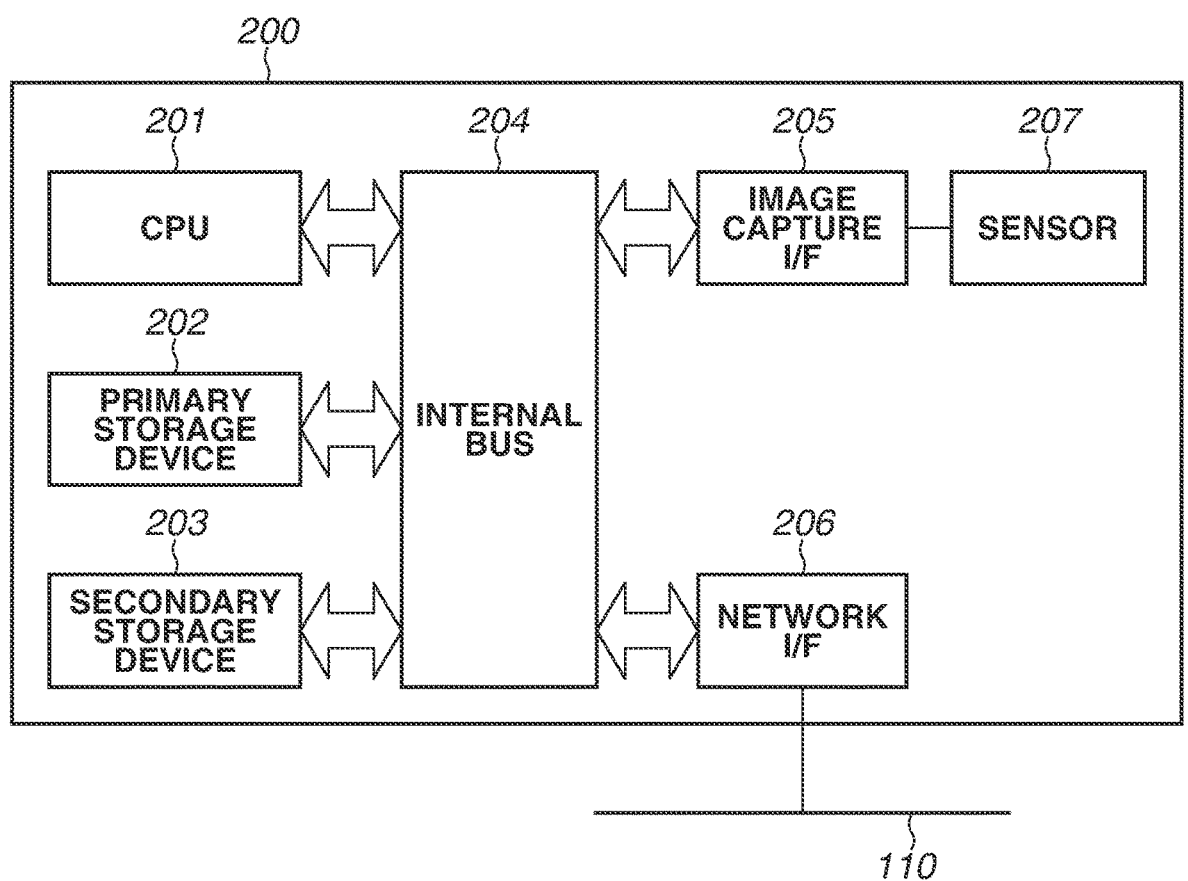
FIG. 2 is a hardware configuration diagram illustrating the hardware configuration of a camera server which is a video distribution apparatus.

FIG. 2 illustrates an example of the hardware configuration of the camera server 200, which is a video distribution apparatus. The hardware of the camera server 200 can mainly include, for example, semiconductor devices and wiring connecting the semiconductor devices. As illustrated in FIG. 2, the camera server 200 includes a central processing unit (CPU) 201, a primary storage device 202, a secondary storage device 203, an image capture interface (I/F) 205, and a network I/F 206. Further, these components are connected to each other via an internal bus 204. The camera server 200 further includes a sensor 207 configured to supply images to the image capture I/F 205.

The CPU 201 comprehensively controls operations of the components included in the camera server 200. The primary storage device 202 is a high-speed, rewritable storage device, such as a random-access memory (RAM), and can be a volatile storage device. The primary storage device 202 is a storage device into which an operating system (OS), various programs, and various types of data are loaded, and can be used as a work area of the OS and the various programs.

The secondary storage device 203 is, for example, a non-volatile storage device, such as a flash memory, a hard disk drive (HDD), and a Secure Digital (SD) (registered trademark) card, and can be used mainly as a semi-permanent storage area for the OS, various programs, and various types of data. The secondary storage device 203 can be used as a short-term storage area for various types of data. The camera server 200 is capable of executing various types of processing based on the various programs stored in the primary storage device 202 and the secondary storage device 203, and details thereof will be described below.

The image capture I/F 205 is connected to the sensor 207, converts video data supplied from the sensor 207 into a predetermined format, compresses the converted video data, and transfers the compressed video data to the primary storage device 202. The network I/F 206 is an interface for connecting to the network 110 and performs communication with the client 120, etc. via a communication medium, such as Ethernet. The network I/F 206 may include a transmission buffer for sequentially transmitting stored data. The transmission buffer, for example, transmits stored data and then clears the data in the buffer and waits for storage of next data to be transmitted. The transmission buffer can be, for example, a first-in-first-out (FIFO) buffer which outputs data in the order of storage.

The sensor 207 is an optical sensor of, for example, a camera, and captures video images using a light-detecting element, such as a charge coupled device (CCD) sensor or a complementary metal-oxide semiconductor (CMOS) sensor.
(Functional Configuration of Camera Server 200)

Figure 3:
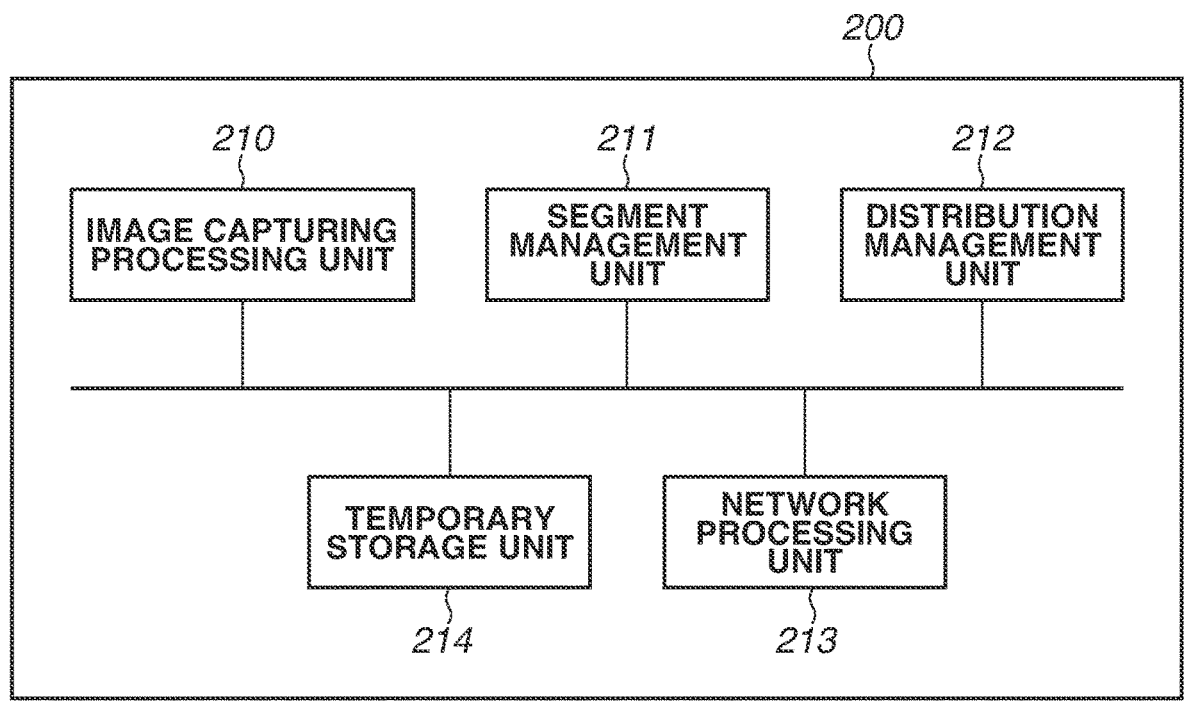
FIG. 3 is a functional block diagram illustrating the functional configuration of the camera server realized by the hardware configuration illustrated in FIG. 2.

FIG. 3 is a functional block diagram illustrating an example of the functional configuration of the camera server 200 realized by the hardware configuration illustrated in FIG. 2. As illustrated in FIG. 2, the camera server 200 includes an image capturing processing unit 210, a temporary storage unit 214, and a segment management unit 211. The image capturing processing unit 210, the temporary storage unit 214, and the segment management unit 211 are respectively an image capturing unit, a holding unit, and a generation unit. Further, the camera server 200 includes a distribution management unit 212 and a network processing unit 213. The distribution management unit 212 includes some of the functions of a distribution unit and a reception unit, and the network processing unit 213 includes other functions of the reception unit and the distribution unit. Alternatively, the camera server 200 may not include an image capturing processing unit 210, and the image capturing unit may be configured as a separate device from the camera server 200.

The image capturing processing unit 210 captures video images. The temporary storage unit 214 stores the captured video images in a unit video image. The distribution management unit 212 receives a request regarding the segment length, which is transmitted from the client 120, and gives an instruction to transmit a segment generated based on the request. The segment management unit 211 generates from the stored unit video images a segment of the segment length corresponding to the received request. The network processing unit 213 distributes the segment based on the instruction from the distribution management unit 212.

The segment length may be defined by the number of unit video images contained in one segment. Furthermore, the unit video image can be defined by one video frame or a plurality of video frames. Further, the segment can be a unit obtained by dividing a group of pictures (GOP) into one group or a plurality of groups. The temporary storage unit 214 may be a part of the area of the primary storage device 202, which is a RAM, etc. The functional configuration illustrated in FIG. 3 is realized by a combination of the hardware illustrated in FIG. 2 and software which operates using the hardware configuration. For example, each functional configuration can be a program which runs on the OS. Specifically, the image capturing processing unit 210 can be configured with an image capturing processing program, the distribution management unit 212 with a distribution management program, the segment management unit 211 with a segment management program, and the network processing unit 213 with a network processing program.

Specifically, the image capturing processing unit 210 acquires via the image capture I/F 205 video frames generated by the sensor 207 and executes encoding processing on the acquired video frames. Further, the image capturing processing unit 210 stores the encoded video frames in the temporary storage unit 214 with moving image meta-information necessary for video reproduction, such as sequence parameter sets (SPS) and picture parameter sets (PPS). In other words, the image capturing processing unit 210 stores the video frames each of which are the corresponding one of the unit video images in the temporary storage unit 214.

While individual unit video image(s) included in a segment is assumed to be one video frame in the present exemplary embodiment, the unit video image does not necessarily have to be a single video frame and may be, for example, a plurality of video frames. The case in which the unit video image is a single video frame will be described below as an example.

The temporary storage unit 214 temporarily stores the generated video frames and moving image meta-information. The segment management unit 211 generates an initialization segment and a segment (segment information) from the moving image meta-information and the video frames stored in the temporary storage unit 214 by the image capturing processing unit 210, respectively, and notifies the distribution management unit 212. The initialization segment is a segment containing information necessary for video reproduction and is generated from, for example, the moving image meta-information including the SPS and PPS.

The distribution management unit 212 transmits via the network processing unit 213 a Media Presentation Description (MPD) file describing all distributable video stream information, the initialization segment, and the segment. The segment management unit 211 manages information about the segment length of the video images to be distributed to the client 120 as segment management information. The information about the segment length may be, for example, the number of unit video images contained in one segment. For example, the number of unit video images (video frames) contained in one segment can be designated at the beginning by the distribution management unit 212 based on a request from the client 120. The segment management unit 211 generates a segment by combining the unit video images corresponding to the number of unit video images which is requested from the client 120 and specified by the segment management information. The distribution management unit 212 adds to the segment generated by the segment management unit 211 header information about the segment and distributes the segment with the header information to the client 120.

Hereinafter, the segment generated by the segment management unit 211 is also referred to as segment information. The segment information is information about the video frames contained in one segment or a plurality of segments. The information about the video frames can be video data or, for example, the address of the temporary storage unit 214 which stores the video data of the video frames contained in the segment. In this way, the segment management unit 211 forms a segment by reading the video data in the temporary storage unit 214 of the designated address at the time of transmitting the segment without generating and storing a segment file containing the video data.

The segment management unit 211 holds the video frames (segment information) in the temporary storage unit 214 until the segment information is released. The distribution management unit 212 generates a header portion with respect to the generated segment, combines the header portion with the video data corresponding to the video frame described in the segment information, and transmits the video data with the header portion to the client 120 via the network processing unit 213.

Alternatively, the distribution management unit 212 can transmit the segment file after a request for the segment file containing the video data is received from the client 120. Depending on the protocol, such as Hypertext Transfer Protocol Version 2 (HTTP/2) or WebSocket, the distribution management unit 212 can generate a video frame and sequentially transmit the video frame once a segment file is completely generated even if no request is received.

(Configuration of Client 120)

The hardware configuration of the client 120 mainly includes, for example, semiconductor devices and wiring connecting the semiconductor devices, and the sensor 207 and the image capture I/F 205 in the hardware configuration of the camera server 200 in FIG. 2 can be omitted. Further, the hardware configuration of the client 120 can include, for example, an input unit, such as a mouse or keyboard, for inputting signals and a display unit which displays images of input contents and results of input instructions.

(Functional Configuration of Client 120)

Figure 4:
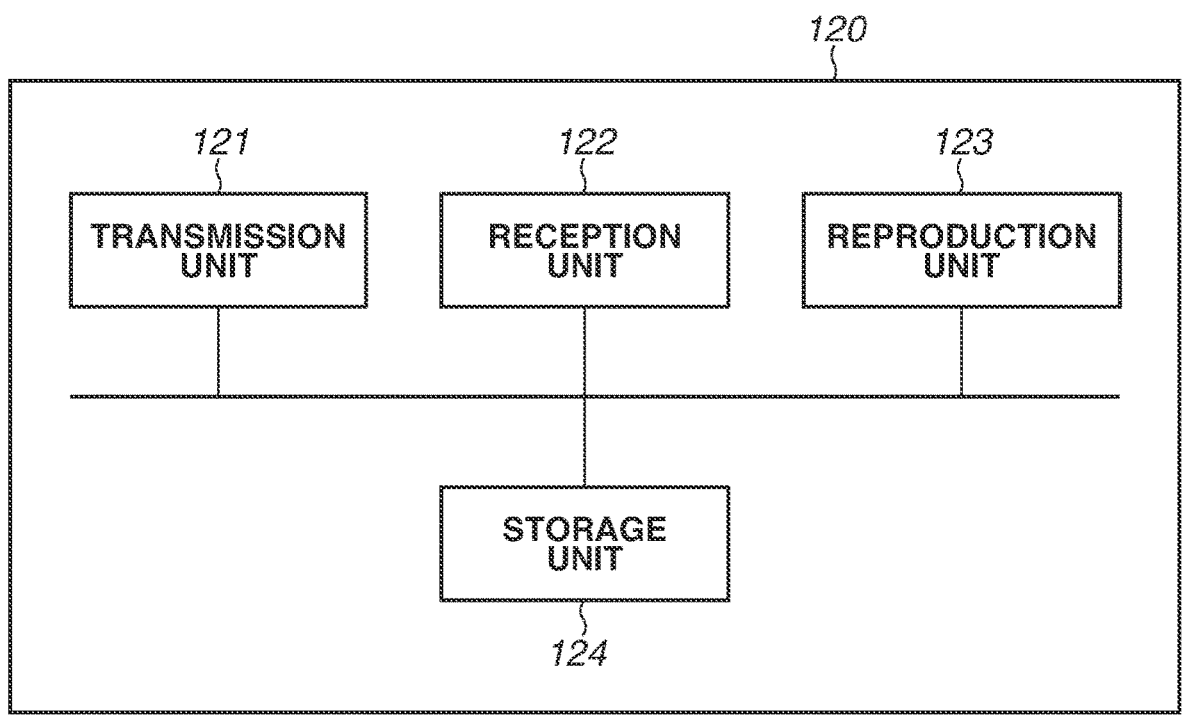
FIG. 4 is a functional block diagram illustrating the functional configuration of a reception apparatus.

FIG. 4 is a functional block diagram illustrating an example of the functional configuration of the client 120. The functional configuration illustrated in FIG. 4 is realized by a combination of hardware and software which operates using the hardware configuration. As illustrated in FIG. 4, the client 120 includes a transmission unit 121, a reception unit 122, and a reproduction unit 123. The transmission unit 121 transmits a request regarding the segment length of the video images to be distributed. The reception unit 122 receives a segment of the segment length based on the request. The reproduction unit 123 sequentially reproduces the received segments. Further, the client 120 can include a storage unit 124 for storing the received segment.

(Example of Configuration of Distribution Data)

Figure 5:
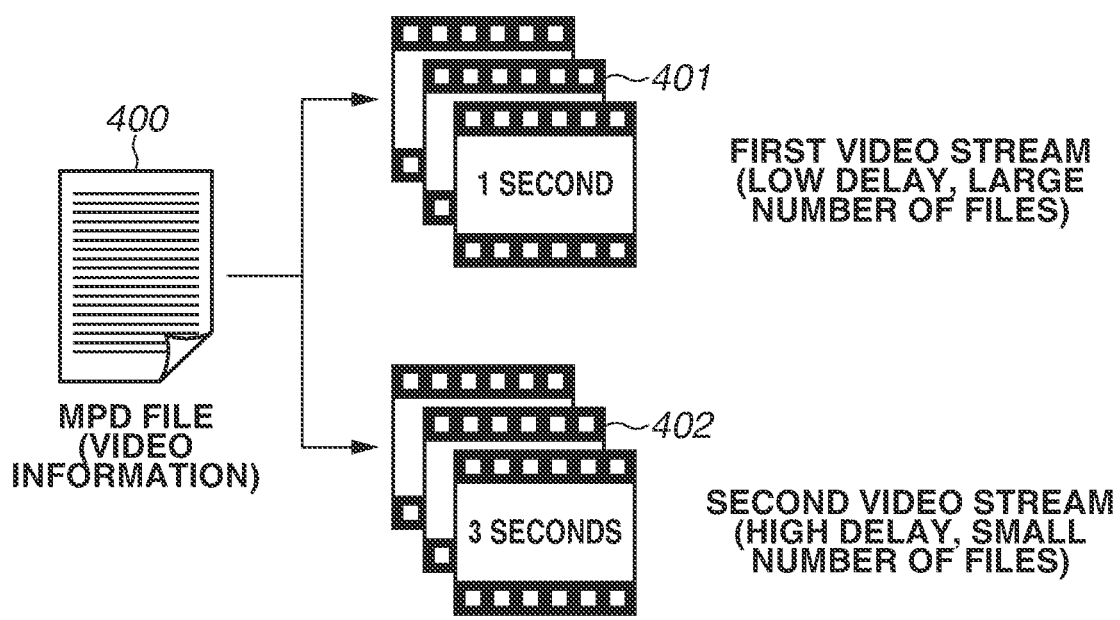
FIG. 5 illustrates transmission data of Dynamic Adaptive Streaming over Hyper Text Transfer Protocol (HTTP) (DASH) distribution which is an example of a transmission form according to an exemplary embodiment of the present invention.

FIG. 5 illustrates transmission data of DASH distribution, which is an example of a transmission form in the present exemplary embodiment. As illustrated in FIG. 5, the transmission data contains an MPD file 400 containing video stream information. In the MPD file 400, resolution and encoding information about each video stream, information about segments which are video files segmented by unit time, etc. are defined as a single piece of or a plurality of pieces of video stream information.

FIG. 5 illustrates an example in which two video streams are defined in the MPD file 400. A first video stream 401 is, for example, a video file in which one segment is one second, and is reproducible with high real-time performance and low delay while the number of files to be downloaded by the client 120 increases. On the other hand, a second video stream 402 is, for example, a video file in which one segment is three seconds, and the number of files to be downloaded is reduced while a delay occurs during the reproduction at the client 120.

While the segment time of the video streams with low delay is specified as one second in the present exemplary embodiment to simplify the description, if it is desired to transmit with higher real-time performance than, for example, camera control, the segment time is desirably set to one second or shorter. Further, the MPD file 400 can define two or more video streams or one video stream in response to a request from the client 120.

Figure 6:
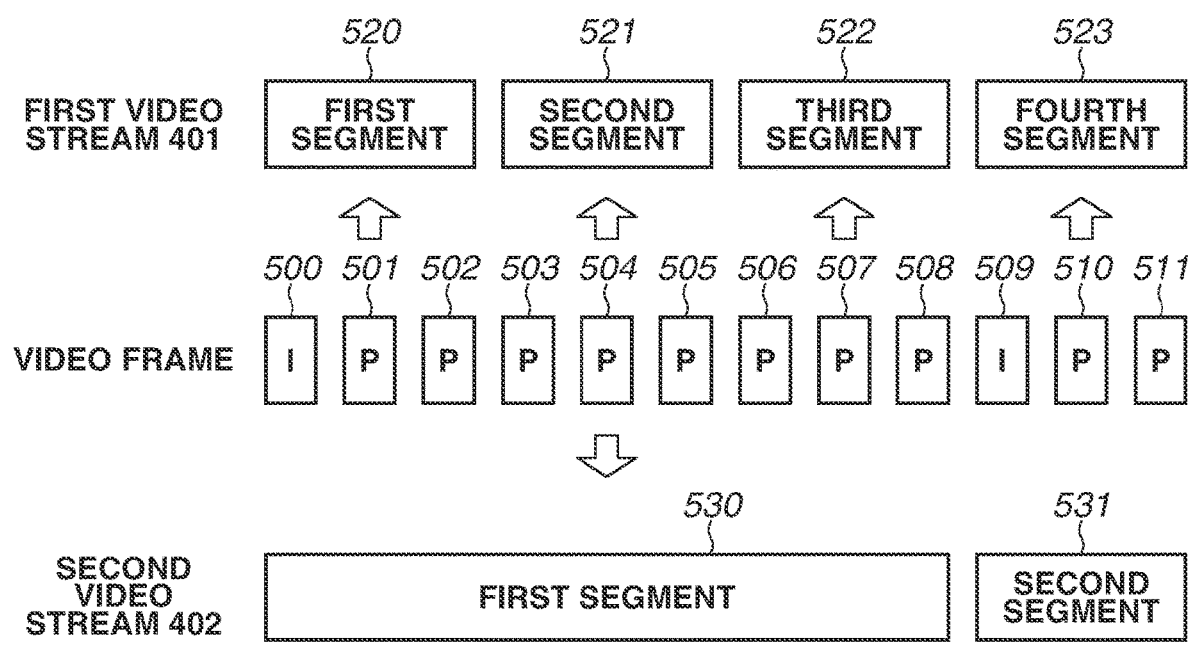
FIG. 6 illustrates the configurations of first and second video streams in a case in which a unit video image is a single video frame.

FIG. 6 illustrates the configurations of the first video stream 401 and the second video stream 402 in the case in which the unit video image is made up of one video frame. In the example, the number of video frames to be reproduced per second is three to make the description easy to understand. Alternatively, the number of video frames to be reproduced per second can be any number and, for example, can be 60 or more. Video frames 500 to 511 in FIG. 6 are sequentially generated by the image capturing processing unit 210 and stored in the temporary storage unit 214.

In FIG. 6, the video frames 500 and 509 are I frames including video information necessary for configuring a complete video frame. Further, the other video frames 501 to 508, 510, and 511 are P frames including video information about a difference from an immediately preceding image.

In the first video stream 401, a first segment 520 contains the video frames 500, 501, and 502, and a second segment 521 contains the video frames 503, 504, and 505. Further, a third segment 522 contains the video frames 506, 507, and 508, and a fourth segment 523 contains the video frames 509, 510, and 511. In the second video stream 402, a first segment 530 contains the video frames 500 to 508, and a second segment 531 contains at least the video frames 509, 510, and 511.

Further, the second segment 531 further includes thereafter a video frame (not illustrated) generated by the image capturing processing unit 210 and stored in the temporary storage unit 214. While the P frames are described as the video information about the difference in the example illustrated in FIG. 6, the video information about the difference can be B frames.

(Distribution Sequence of Video Stream)

Figure 7:
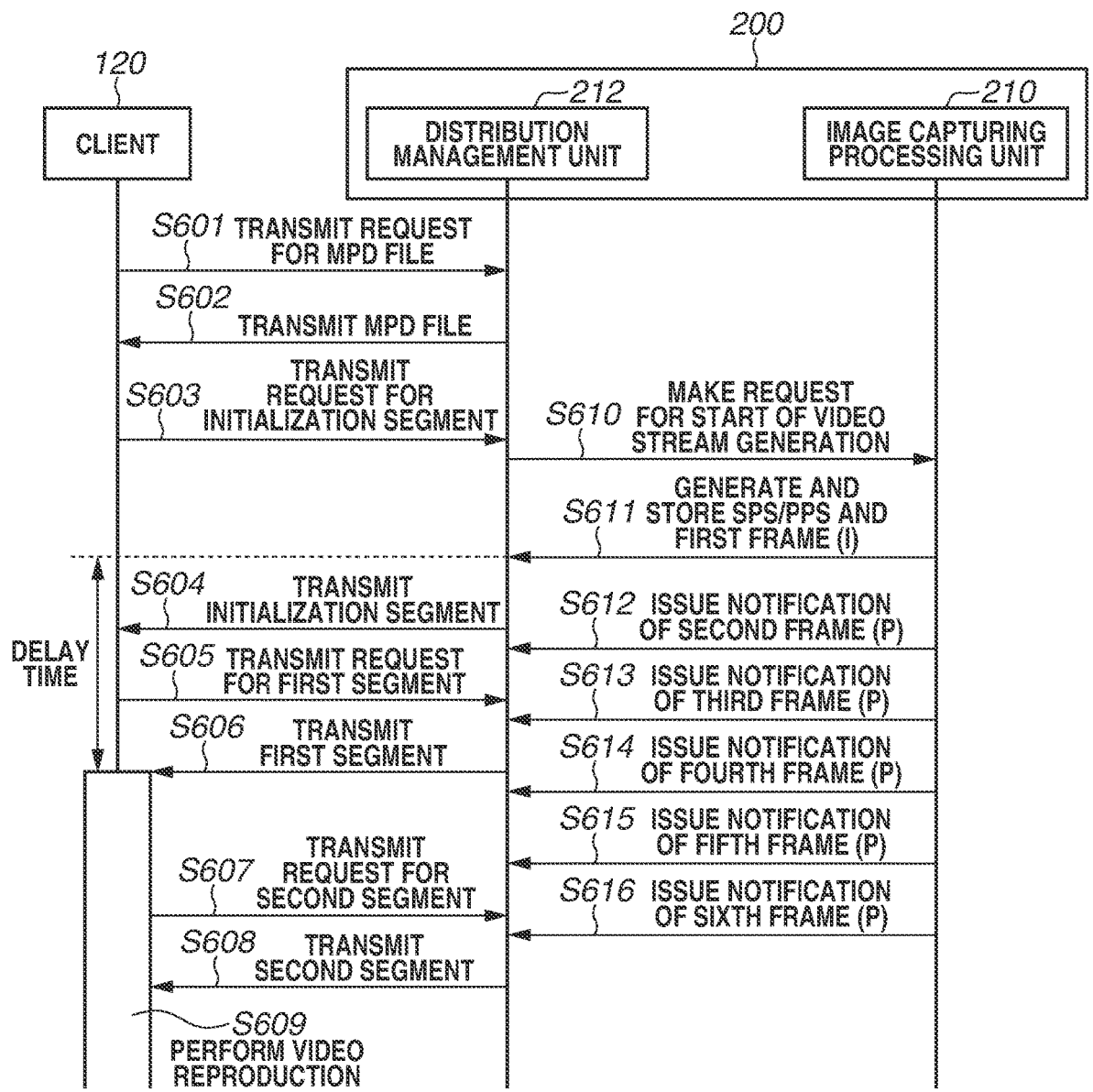
FIG. 7 is a sequence diagram illustrating an example of a process of transmitting a video image using a first video stream.

FIG. 7 is a sequence diagram illustrating an example of a process of distributing video images in the first video stream 401 to the client 120. In the sequence diagram, description of the segment management unit 211, the network processing unit 213, and the temporary storage unit 214 is omitted to avoid a complication of the diagram. Description of the configurations will be included in the following description of the processing of the distribution management unit 212. Each arrow from the image capturing processing unit 210 to the distribution management unit 212 includes the writing of, for example, a video frame via the temporary storage unit 214 and/or a notification issued based on the writing of the video frame. Further, the segment generation includes the processing in which the segment management unit 211 reads a video frame from the temporary storage unit 214 and generates a segment.

As illustrated in FIG. 7, first, in step S601, the client 120 transmits to the camera server 200 an acquisition request for acquisition of the MPD file 400 of the collection of video information. In step S602, the distribution management unit 212 of the camera server 200 which receives the acquisition request generates the MPD file 400 storing the transmittable video stream information and transmits the generated MPD file 400 to the client 120.

In step S603, the client 120 selects, from among the received MPD file 400, a video stream to be received based on the CPU capacity, display resolution, etc. of the client 120 and transmits to the camera server 200 an acquisition request for acquisition of the initialization segment containing necessary information for reproduction. The initialization segment acquisition request can contain the segment length of video data to be distributed to the client 120. Hereinafter, a case will be described in which the client 120 selects the first video stream 401 in which each segment includes three video frames.

In step S610, in order to transmit the initialization segment, the distribution management unit 212 in the camera server 200 which receives the initialization segment acquisition request requests the image capturing processing unit 210 to start generating the video stream. In step S611, the image capturing processing unit 210 which receives the request generates SPS/PPS and an I frame that is the first video frame and stores the SPS/PPS and the I frame in the temporary storage unit 214. In step S604, the segment management unit 211 reads the SPS/PPS and generates moving image meta-information containing the SPS/PPS as the initialization segment, and the distribution management unit 212 transmits the generated initialization segment to the client 120. In steps S612 to S616, the image capturing processing unit 210 sequentially generates video frames and notifies the distribution management unit 212, independently of the communication with the client 120.

In step S605, after receiving the initialization segment, the client 120 transmits to the camera server 200 an acquisition request for acquisition of the first segment. In step S613, the image capturing processing unit 210 stores third video frame data, and then in step S606, the distribution management unit 212 combines the first video frame data to the third video frame data and transmits the combined data as the first segment to the client 120. At this time, the distribution management unit 212 can sequentially store in the transmission buffer the header information as the segment file and unit video data (first video frame data to third video frame data) corresponding in number to the segment length. In this way, although the video images of one segment are not stored as a video file in the camera server 200, the client 120 can receive the video images as a file of one segment.

In step S609, after receiving the first segment, the client 120 can perform video reproduction. The client 120 can start video reproduction after a predetermined time of buffering.

In step S607, the client 120 transmits an acquisition request for acquisition of the next second segment.

In step S616, the image capturing processing unit 210 stores sixth video frame data in the temporary storage unit 214, and the distribution management unit 212 which receives the request reads fourth video frame data to sixth video frame data. In step S608, the distribution management unit 212 combines the fourth video frame data to the sixth video frame data and transmits the combined data as the second segment to the client 120.

At this time, the distribution management unit 212 may sequentially store in the transmission buffer the header information as the segment file and unit video data (fourth video frame data to sixth video frame data) corresponding in number to the segment length. In this way, although the video images of one segment are not stored as a video file in the camera server 200, the client 120 can receive the video images as a file of one segment. To avoid interruption of the video image, the client 120 can sequentially reproduce the video frames contained in the second segment after reproducing the video frames contained in the first segment.

A delay time illustrated in FIG. 7 is an elapsed time between the timing of step S611 in which the first video frame is stored and the timing of step S606 in which the first segment is transmitted. The delay time constantly occurs during the video image transmission, and the real-time performance is high when the delay time is short, whereas the real-time performance is low when the delay time is long. For example, in a case of transmitting a video stream in which one segment includes six video frames, the first segment is transmitted after the sixth video frames are generated, so the delay time is the difference in time between the timing of step S611 and the timing of step S608.

As described above, the camera server 200 in the present exemplary embodiment stores the video images by video frame as a unit video image, and at the time of transmission, the camera server 200 generates the segments of the segment length according to the request and transmits the generated segments. In this way, the video images corresponding to the request from the client (video reception apparatus) 120 are transmitted while the processing load on the CPU of the camera server 200 and/or the memory size is reduced. Furthermore, the camera server 200 is capable of transmitting video images in real time with less delay time in response to a request. Moreover, the camera server 200 is capable of transmitting video images in real time with higher transmission efficiency and reproduction quality in response to a request due to a decreasing number of downloads.

Figure 8:
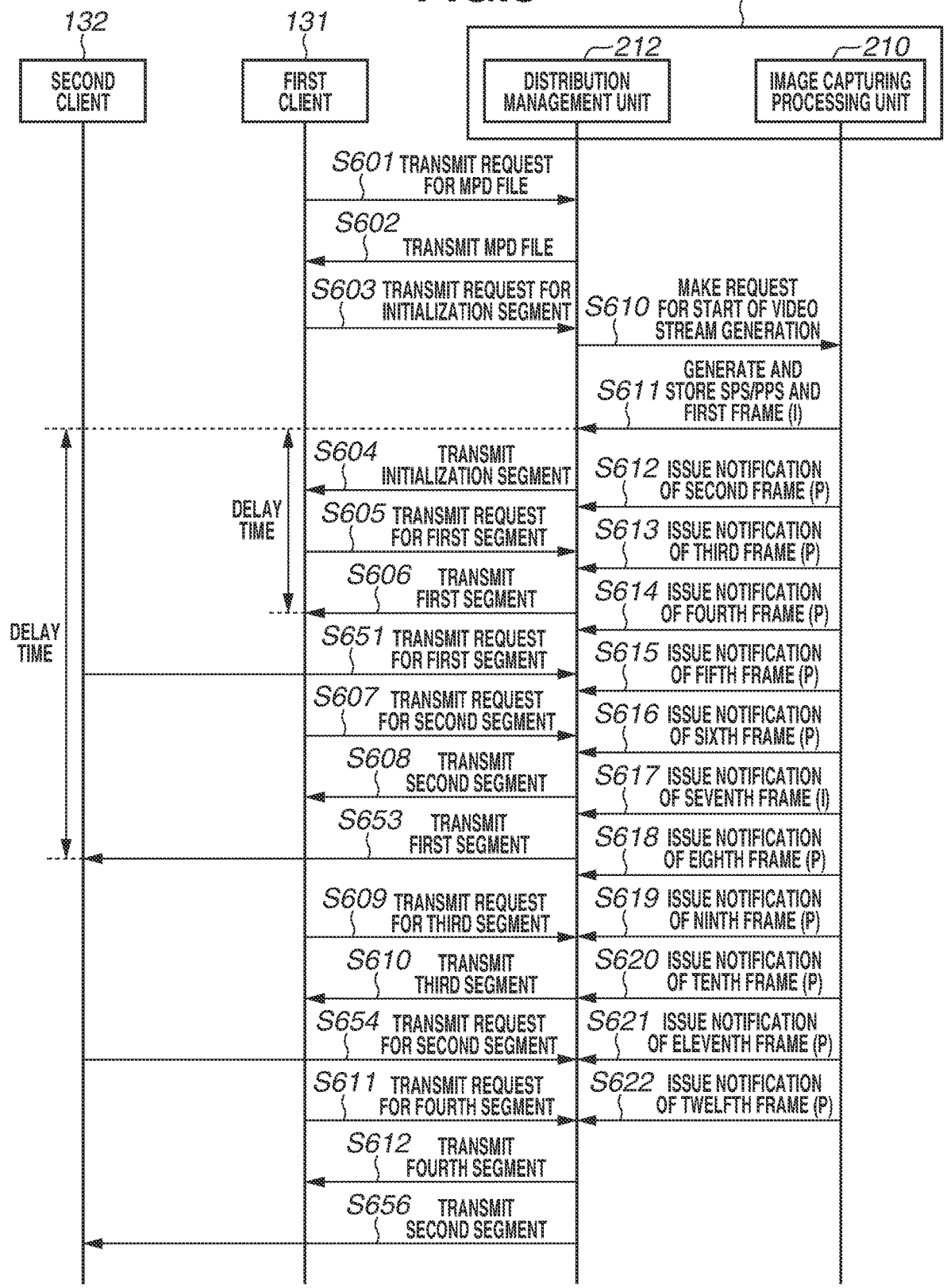
FIG. 8 is a sequence diagram illustrating a case of transmitting a video image to both first and second clients in the video distribution system.

FIG. 8 is a sequence diagram illustrating a case in which the client 120 in the video distribution system 100 in FIG. 1 is a plurality of clients, a first client 131 and a second client 132, and the video image is transmitted to both the first client 131 and the second client 132. In the sequence diagram, the process of the first client 131 is similar to the process of the client 120 in FIG. 7, except for a process from a seventh video frame and thereafter, so redundant description of up to the sixth video frame is omitted. In steps S617 to S622, for the seventh video frame and subsequent frames, the image capturing processing unit 210 sequentially generates video frame data and notifies the distribution management unit 212 independently of the communication with the first client 131, as in the case of the first video frame.

In step S609, the first client 131 transmits to the camera server 200 an acquisition request for acquisition of the third segment. In step S619, the distribution management unit 212 is notified of ninth video frame data by the image capturing processing unit 210, and then in step S610, the distribution management unit 212 reads and combines the seventh to the ninth video frame data and transmits the combined data as the third segment to the first client 131. The first client 131 may perform video reproduction after receiving the third segment. Then, in step S611, the first client 131 transmits an acquisition request for acquisition of the next fourth segment. In step S622, the distribution management unit 212 which receives the request is notified of twelfth video frame data by the image capturing processing unit 210, and the distribution management unit 212 reads the tenth to the twelfth video frame data. Then, in step S612, the distribution management unit 212 combines the tenth to the twelfth video frame data and transmits the combined data as the fourth segment to the first client 131.

Next, the process of the second client 132 will be described below. As in the process of the first client 131, requests for the MPD file 400 and the initialization segment are made and the MPD file 400 and the initialization segment are transmitted between the second client 132 and the distribution management unit 212, but illustration thereof is omitted to avoid a complication of FIG. 8. The process of the second client 132 after the completion of reception of the initialization segment will be described below.

As illustrated in FIG. 8, in step S651, the second client 132 transmits to the camera server 200 an acquisition request for acquisition of the first segment. In step S616, the distribution management unit 212 is notified of the sixth video frame data by the image capturing processing unit 210, and then in step S653, the distribution management unit 212 reads and combines the first to the sixth video frame data and transmits the combined data as the first segment to the second client 132. After receiving the first segment, the second client 132 performs video reproduction. Further, the second client 132 may start video reproduction after a predetermined time of buffering. In step S654, the second client 132 transmits an acquisition request for acquisition of the next second segment. In step S622, the distribution management unit 212 of the camera server 200 which receives the request is notified of the twelfth video frame data by the image capturing processing unit 210 and then reads the seventh video frame data to the twelfth video frame data. Then, in step S656, the distribution management unit 212 combines the seventh video frame data to the twelfth video frame data and transmits the combined data as the second segment to the second client 132.

Specifically, for example, the distribution management unit 212 receives a request regarding a first segment length for a video image in which one segment includes three video frames. The distribution management unit 212 receives a request regarding a second segment length different from the first segment length with respect to a video image in which one segment includes six video frames. The distribution management unit 212 reads video frame data (unit video image) corresponding in number to the first segment length and video frame data (unit video image) corresponding in number to the second segment length and transmits the video images respectively as the segment of the first segment length and the segment of the second segment length to the request sources. As described above, the camera server 200 stores the video images by video frame as a unit video image, and at the time of transmission, the camera server 200 generates the segments of the segment length in accordance with the request. In this way, the video images of different segment lengths are transmitted in parallel in accordance with the different requests from both the first client 131 and the second client 132 while the processing load on the CPU of the camera server 200 and/or the memory size is reduced. Furthermore, the camera server 200 is capable of transmitting video images in real time with less delay time in response to a request. Moreover, the camera server 200 is capable of transmitting video images in real time with higher transmission efficiency and reproduction quality in accordance with a request due to a decreasing number of downloads.

(Flowchart of Process of Segment Management Unit)

Figure 9:
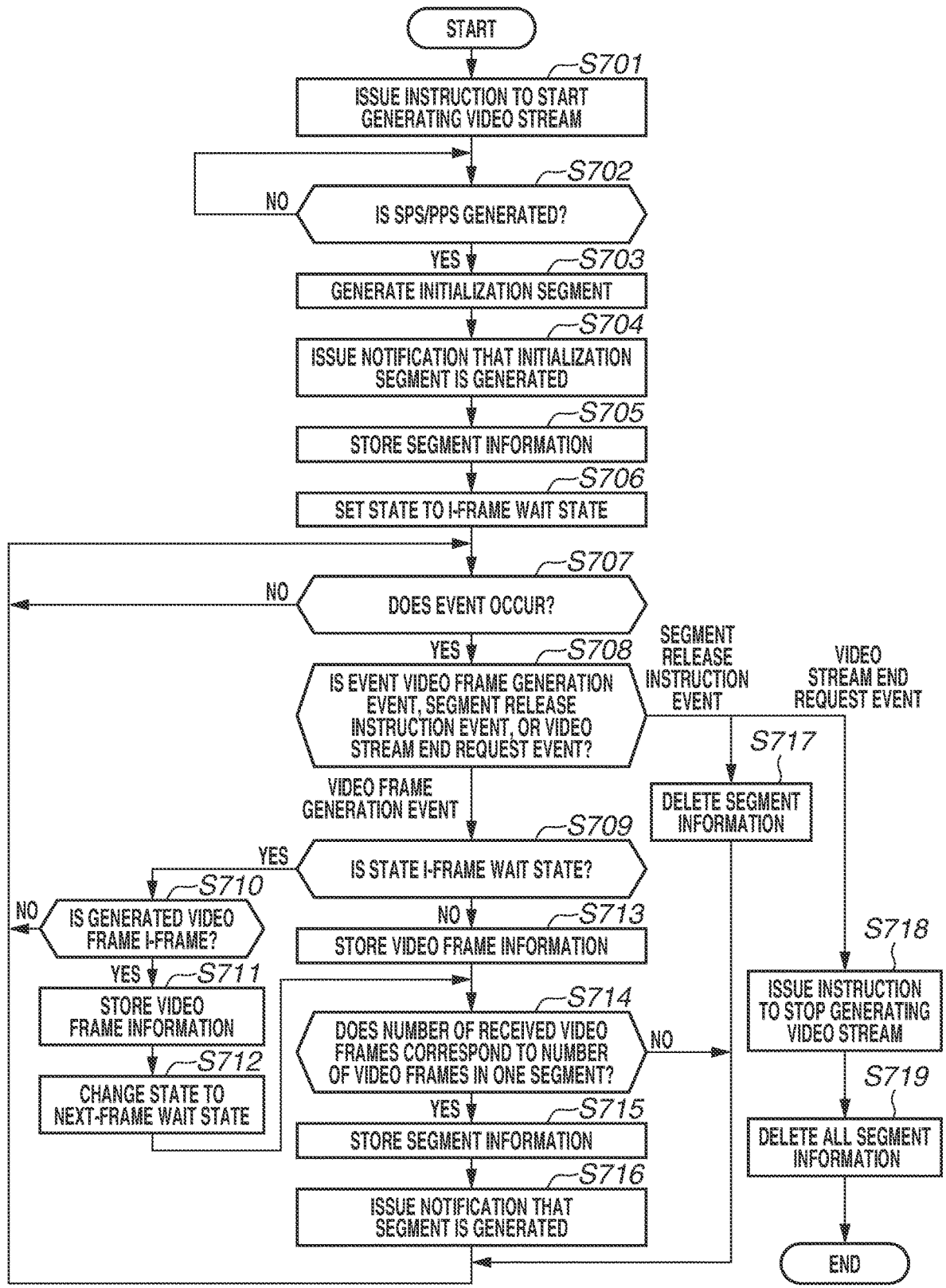
FIG. 9 is a flowchart illustrating an example of a process of a segment management program.

FIG. 9 is a flowchart illustrating an example of a process of the segment management unit 211. In the example, the segment management program executed by the segment management unit 211 may be activated by an instruction from the distribution management program executed by the distribution management unit 212 based on the initialization segment. First, in step S701, the segment management unit 211 instructs the image capturing processing unit 210 to start generating the requested video stream, and in step S702, the segment management unit 211 waits until moving image meta-information containing SPS/PPS is generated.

If the moving image meta-information is generated (YES in step S702), then in step S703, the segment management unit 211 reads the moving image meta-information from the temporary storage unit 214 and generates an initialization segment containing the read moving image meta-information. In step S704, the segment management unit 211 notifies the distribution management unit 212 that the initialization segment is generated.

Next, in step S705, the segment management unit 211 stores information designated at the time of activation, such as the number of video frames contained in one segment which is specified in the initialization segment request and is to be managed as segment management information. Thereafter, in step S706, the segment management unit 211 sets the state of the program to an I frame wait state, and then in step S707, the segment management unit 211 waits for an event to occur.

If an event occurs (YES in step S707), then in step S708, the segment management unit 211 determines which event has occurred. If the event that has occurred is a video frame generation event from the image capturing processing unit 210 (VIDEO FRAME GENERATION EVENT in step S708), then in step S709, the state of the program is determined. If the state of the program is the I frame wait state (YES in step S709), then in step S710, the segment management unit 211 determines whether the generated video frame is an I frame. If the generated video frame is not an I frame (NO in step S710), the processing returns to step S707 to repeat the process. If the generated video frame is an I frame (YES in step S710), then in step S711, the segment management unit 211 stores the SPS/PPS and video frame information in the temporary storage unit 214.

The video frame information does not necessarily have to be the video data but, for example, the video frame information may be the address of the temporary storage unit 214 storing the video data about the video frame. In this way, the segment management unit 211 can read the video data about the video frame without copying the video data.

Next, in step S712, the segment management unit 211 changes the state of the program to a next frame wait state. Then, the processing to be performed by the segment management unit 211 proceeds to step S714 (described below). In step S709, if the state of the program is the next frame wait state (NO in step S709), then in step S713, the segment management unit 211 stores the video frame information. After the video frame information is stored in step S713, or after the state of the program is changed to the next frame wait state in step S712, the processing of the segment management unit 211 proceeds to step S714.

In step S714, the segment management unit 211 determines whether the number of generated (received) video frames corresponds to the number of video frames contained in one segment. If the number of generated (received) video frames corresponds to the number of video frames contained in one segment (YES in step S714), then in step S715, the segment management unit 211 stores in the temporary storage unit 214 the segment number and the segment information that is information about the video frames contained in the segment. In step S715, the plurality of video frames to be stored as the segment information is combined and distributed to the client 120 which is the distribution request source.

The video frame information to be stored in step S715 does not necessarily have to be the video data but, for example, the address of the temporary storage unit 214 storing the video data on the video frames contained in the segment. In this way, the segment management unit 211 generates the segment at the time of transmitting the segment by reading the video data in the temporary storage unit 214 of the designated address without generating and storing a segment file containing the video data.

In step S716, the segment management unit 211 notifies the distribution management program that the segment is generated, and in step S707, the segment management unit 211 waits for an event to be received again. In step S714, if the number of generated video frames does not correspond to the number of video frames contained in one segment (NO in step S714), then in step S707, the segment management unit 211 waits for an event to be received again.

In the processes of steps S715 and S716, the segment management unit 211 stores only the segment information and the video frame information and issues a notification thereof for the following reason. If the segment is generated from the video data portion in the video frames by the segment management unit 211, the segment management unit 211 needs to execute video data copying processing. In such a case, the segment management unit 211 needs to store the segment for each of the clients 120 and thus may use more of the temporary storage unit 214.

The flowchart illustrates the case in which the image capturing processing unit 210 continuously generates video frames. Alternatively, if there can be a case in which video frames are not generated continuously, whether or not the video frames are consecutive is determined, and if the video frames are not consecutive, the segment management unit 211 may be configured to set the state of the program to the I frame wait state again.

In step S708, if it is determined that the event that occurs is a segment release instruction event (SEGMENT RELEASE INSTRUCTION EVENT in step S708) from the distribution management unit 212, then in step S717, the segment management unit 211 deletes the stored segment information. In step S717, the segment management unit 211 deletes the video frame data contained in the segment. In step S707, the segment management unit 211 then waits again for an event to occur.

In step S708, the event that occurs is a video stream end request event from the distribution management unit 212 (VIDEO STREAM END REQUEST EVENT in step S708), then in step S718, the segment management unit 211 instructs the image capturing processing unit 210 to stop generating the video stream. In step S719, the segment management unit 211 deletes all the stored segment information and video frame information contained in the segment.

In the flowchart, the segment management program executed by the segment management unit 211 is configured to be activated from the distribution management program executed by the distribution management unit 212 when an initialization segment request is received from the client 120. Alternatively, the segment management program may be activated all the time and segment information about the plurality of clients 120 can be managed with one segment management program.

(Flowchart of Process of Distribution Management Unit)

Figure 10:
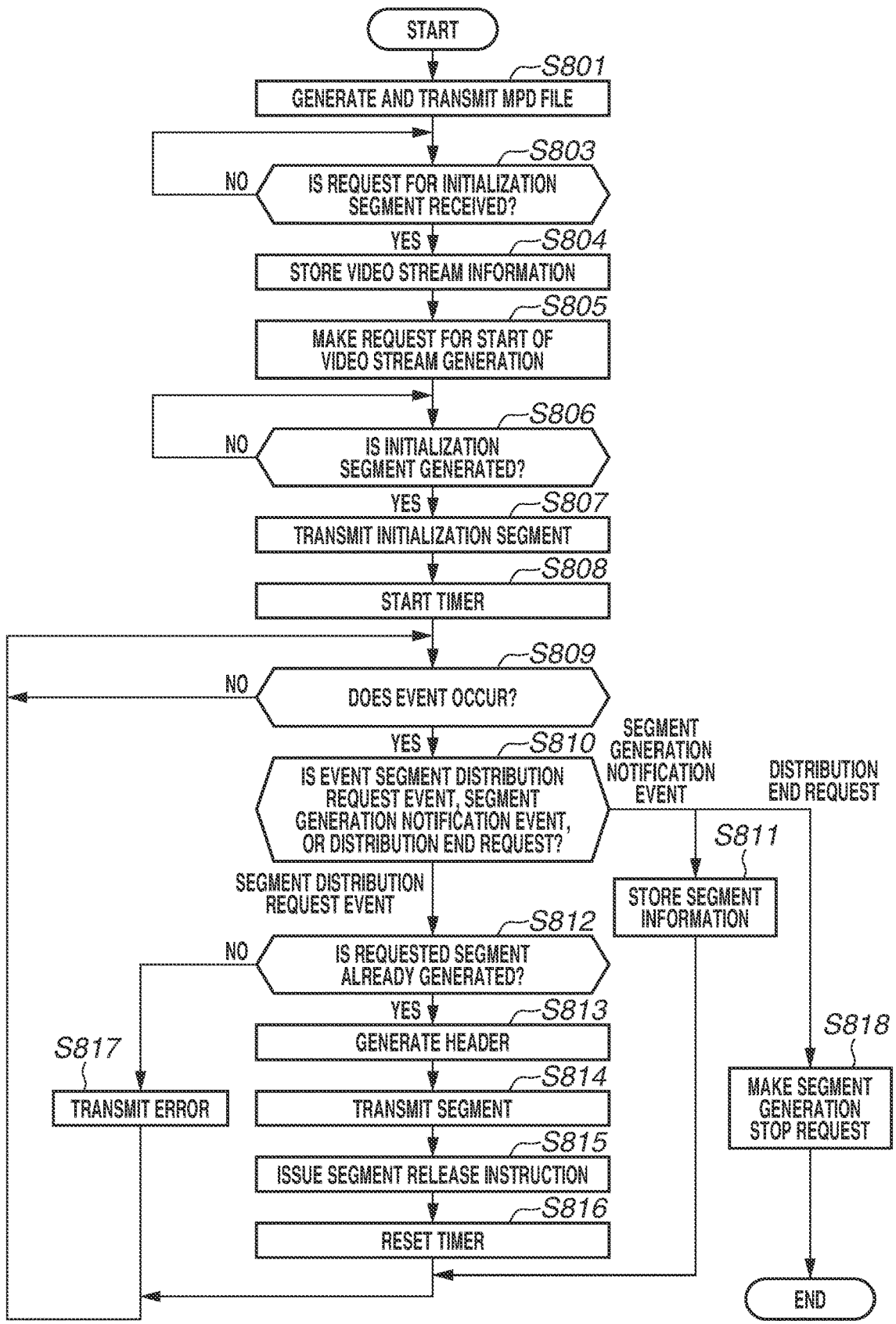
FIG. 10 is a flowchart illustrating an example of a process executed by a distribution management unit.

FIG. 10 is a flowchart illustrating an example of a process of the distribution management unit 212. The distribution management program executed by the distribution management unit 212 can be, for example, a program which is activated when the client 120 makes an initialization segment request. As illustrated in the flowchart, in step S801, the distribution management unit 212 generates the MPD file 400 of a collection of information about a single transmittable video stream or a plurality of transmittable video streams and transmits the MPD file 400 to the client 120.

Next, in step S803, the distribution management unit 212 waits until a request for an initialization segment of any of the video streams defined in the MPD file 400 is received from the client 120. If the distribution management unit 212 receives a request for an initialization segment (YES in step S803), then in step S804, the distribution management unit 212 stores information about the requested video stream, and in step S805, the distribution management unit 212 activates the segment management unit 211 to make a request for a start of video stream generation. In step S806, the distribution management unit 212 waits until the initialization segment is generated by the segment management unit 211, and if the initialization segment is generated (YES in step S806), then in step S807, the distribution management unit 212 transmits the initialization segment to the client 120.

Next, in step S808, the distribution management unit 212 starts a timer to monitor a connection timeout of the client 120, and in step S809, the distribution management unit 212 waits for an event to occur. If an event occurs (YES in step S809), then in step S810, the distribution management unit 212 determines the type of the event that occurs. If the event that occurs is a segment generation notification event from the segment management unit 211 (SEGMENT GENERATION NOTIFICATION EVENT in step S810), then in step S811, the distribution management unit 212 stores the segment information containing the video frame information.

If the event that occurs is a segment distribution request event from the client 120 (SEGMENT DISTRIBUTION REQUEST EVENT in step S810), then in step S812, the distribution management unit 212 determines whether the requested segment is already generated. If the requested segment is already generated (YES in step S812), then in step S813, the distribution management unit 212 generates a header portion of the segment, and in step S814, the distribution management unit 212 transmits to the client 120 the segment as data combined with the data portion of the video frame. Then, in step S815, the distribution management unit 212 instructs the segment management unit 211 to release the transmitted segment.

In step S816, the distribution management unit 212 resets the timer monitoring the connection timeout and extends the timeout time, and the processing returns to step S809 to wait for an event to be received. If the event that occurs in step S809 is the distribution end request (DISTRIBUTION END REQUEST in step S810), then in step S818, the distribution management unit 212 requests the segment management unit 211 to stop generating the segment, and the processing of the distribution management unit 212 ends.

In step S814, the distribution management unit 212 generates only the header portion, and, while combining the header portion with the data portion of the video frame, transmits the header portion with the data portion, so as to prevent an increase in the processing load of the video frame copying and the amount of use of the temporary storage unit 214. In this case, the distribution management unit 212 sequentially stores the header portion and the data portion in the transmission buffer for transmission to the client 120. While the timer is reset when the segment transmission is completed in the flowchart, the distribution management unit 212 can reset the timer at the timing at which the segment distribution request is received or the timing at which another communication is performed with the client 120. Further, any unit, other than the timer, that is capable of monitoring the connection with the client 120 can be used to execute monitoring. Further, the timer monitoring does not necessarily have to be performed.

Further, in step S812, if the requested segment does not exist, then in step S817, the distribution management unit 212 transmits an error response to the client 120. Here, an error response is transmitted if the requested segment does not exist in the flowchart. Alternatively, the distribution management unit 212 may wait until the segment is generated. The transmission end event can include a timeout of the timer monitoring a connection timeout and detection of a disconnection.

While the DASH distribution is described as an example in the flowchart, the camera server 200 of the present exemplary embodiment is also applicable to transmission using other adaptive bitrate streaming techniques, such as HLS distribution. As described above, the camera server 200 of the present exemplary embodiment is capable of performing segment management on consecutively-captured data individually by the client 120 and, at the time of transmission, the camera server 200 combines the video frames contained in the segment and transmits the combined video frames.

Figure 11:
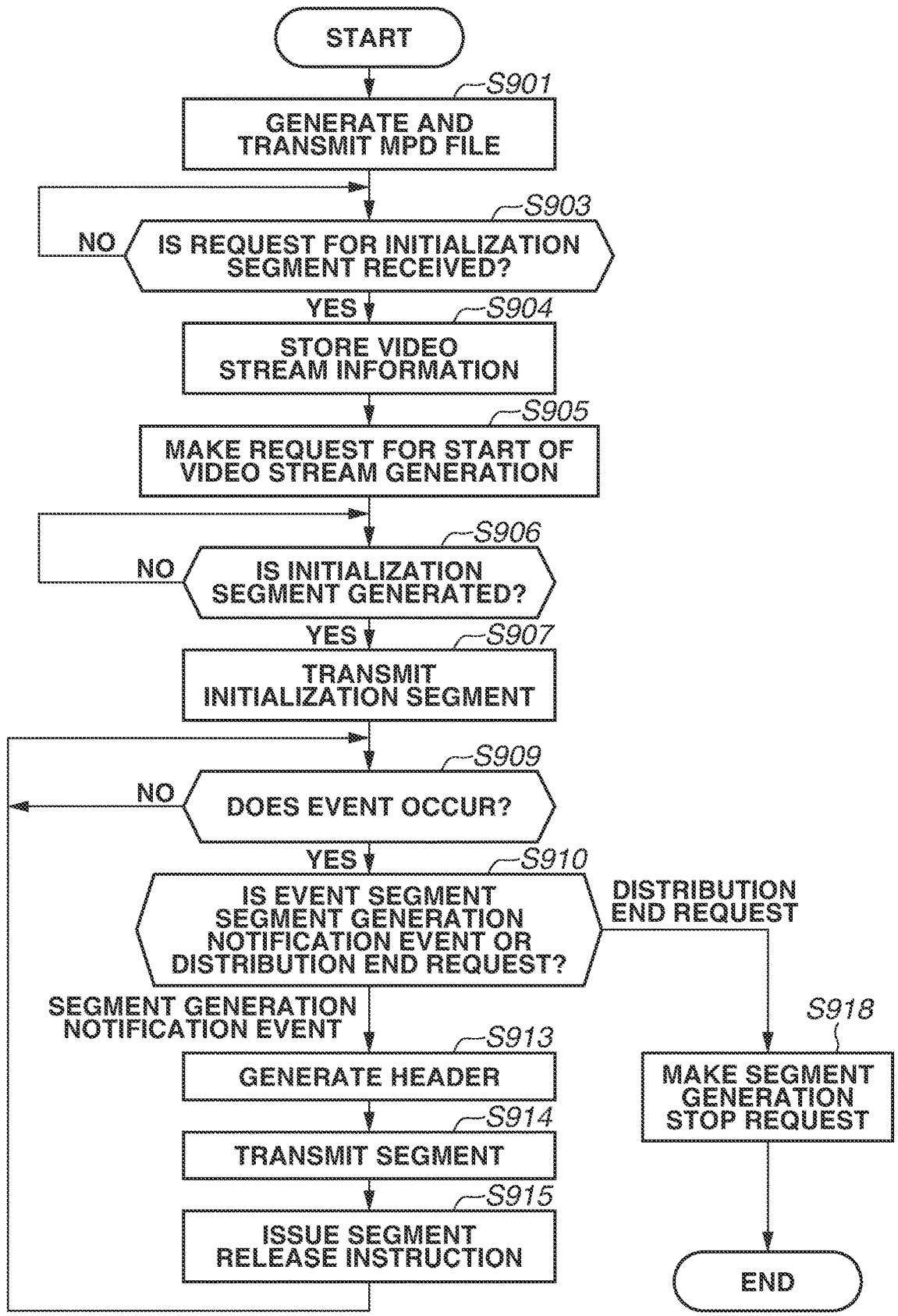
FIG. 11 is a flowchart illustrating another example of the process executed by the distribution management unit.

In this way, the camera server 200 of the present exemplary embodiment reduces the video file when real-time performance is prioritized, whereas the camera server 200 increases the video file when the transmission efficiency is prioritized, thus transmitting the video images with an appropriate delay time for each client 120. FIG. 11 is a flowchart illustrating another example of the process of the distribution management unit 212. As in FIG. 8, the distribution management program can be, for example, a program which is activated when the client 120 makes an initialization segment request.

As illustrated in the flowchart, in step S901, the distribution management unit 212 generates the MPD file 400 of a collection of information about a single transmittable video stream or a plurality of transmittable video streams and transmits the MPD file 400 to the client 120. Next, in step S903, the distribution management unit 212 waits until a request for an initialization segment of any of the video streams defined in the MPD file 400 is received from the client 120.

The distribution management unit 212 transmits the segment using the same communication connection as the initialization segment. In step S915, the distribution management unit 212 instructs the segment management unit 211 to release the transmitted segment, and the processing returns to step S909 to wait for an event to be received. If the event that occurs in step S909 is an event of the distribution end request (DISTRIBUTION END REQUEST in step S910), then in step S918, the distribution management unit 212 requests the segment management unit 211 to stop generating the segment generation, and the process ends.

Next, in step S909, the distribution management unit 212 waits for an event to occur, and if an event occurs (YES in step S909), then in step S910, the distribution management unit 212 determines whether the event that occurs is the segment generation notification event or the distribution end request. If the event that occurs is the segment generation notification event from the segment management unit 211 (SEGMENT GENERATION NOTIFICATION EVENT in step S910), then in step S913, the distribution management unit 212 generates the header portion of the segment. Further, in step S914, the distribution management unit 212 transmits to the client 120 the segment as data combined with the data portion of the video frames.

The distribution management unit 212 transmits the distribution management unit 212 using the same communication connection as the initialization segment. In step S915, the distribution management unit 212 instructs the segment management unit 211 to release the transmitted segment, and the processing returns to step S909 to wait for an event to be received. If the event that occurs in step S909 is an event of the distribution end request (DISTRIBUTION END REQUEST in step S910), then in step S918, the distribution management unit 212 requests the segment management unit 211 to stop generating the segment generation, and the process ends.

The transmission end event includes detection of a disconnection, and the detection of a disconnection can be an event which is detected when a communication connection used for segment transmission is disconnected from the client 120. While the DASH distribution is described as an example in the flowchart, the camera server 200 of the present exemplary embodiment is also applicable to transmission using other adaptive bitrate streaming techniques, such as HLS distribution.

In step S914, the distribution management unit 212 generates only the header portion and, while combining the header portion with the data portion of the video frame, can transmit the header portion with the data portion, so as to prevent an increase in the processing load of the video frame copying and the amount of use of the temporary storage unit 214. In such a case, the distribution management unit 212 sequentially stores the header portion and the data portion in the transmission buffer for transmission to the client 120. As described above, the camera server 200 of the present exemplary embodiment is capable of performing segment management on consecutively-captured data individually by each client 120 and, at the time of transmission, the camera server 200 is capable of combining the video frames contained in the segment and transmits the combined video frames. In this way, the camera server 200 of the present exemplary embodiment reduces the video file when real-time performance is prioritized, whereas the camera server 200 increases the video file when the transmission efficiency is prioritized, thus transmitting the video images with an appropriate delay time for each client 120.

It is assumed that in real-time moving image distribution, with a file of a collection of moving image file information, such as an MPD, a plurality of moving image streams of different segment time is defined to enable the client to select a stream. Further, it is assumed that a moving image stream of a segment time designated by the client is defined. However, an embedded device, such as a network camera, normally has low central processing unit (CPU) performance and limited memory capacity. Thus, it is difficult for such a network camera to prepare a plurality of types of moving image files of different segment time for the client that is only for viewing video images and for the client that performs camera control while viewing video images.

For the video distribution system 100 according to the present exemplary embodiment, the temporary storage unit 214 holds captured video images in unit video images, and the distribution management unit 212 receives a request regarding the segment length which is transmitted from the client 120. The segment management unit 211 generates segments from the unit video images held by the temporary storage unit 214 based on the request regarding the segment length which is received by the distribution management unit 212. Then, the distribution management unit 212 distributes to the client 120 the segments generated by the segment management unit 211. In this way, the video images are distributed as appropriate according to the purpose of use of the client 120.

While an exemplary embodiment of the invention is described above in detail, the above-described exemplary embodiment illustrates a mere example of implementation of the invention. The above-described exemplary embodiment is not intended to limit the technical scope of the invention. Various changes can be made to the invention within the spirit of the invention, and such changes are also encompassed within the technical scope of the invention.

Exemplary embodiment(s) of the invention can also be realized by a process in which a program for realizing one or more functions of the above-described exemplary embodiment is supplied to a system or apparatus via a network or storage medium and one or more processors of a computer of the system or apparatus reads and execute the program. Further, exemplary embodiment(s) of the invention can also be realized by a circuit (e.g., application-specific integrated circuit (ASIC)) which realizes one or more functions.

The above-described exemplary embodiment is capable of distributing video images as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-076652, filed Apr. 7, 2017, which is hereby incorporated by reference herein in its entirety.

What is claimed is:

1. A video distribution apparatus which distributes video in a unit of a segment of the video, the segment of the video being a video file including one or more frames, the video distribution apparatus comprising a computer executing instructions that, when executed by the computer, cause the computer to function as:
   a holding unit configured to hold video data in a unit of a frame;
   a transmitting unit configured to transmit a Media Presentation Description file defining a first type of a video stream which is made up of segments having a first length and a second type of the video stream which is made up of segments having a second length longer than the first length;
   a reception unit configured to receive, from an external apparatus, a request specifying one of the first type of the video stream and the second type of the video stream, selected by the external device;
   a generation unit configured to generate the segment having the first length in a case of the reception unit receiving a request specifying the first type of the video stream, and generate the segment having the second length in a case of the reception unit receiving a request specifying the second type of the video stream; and
   a distribution unit configured to distribute to the external apparatus the segment generated by the generation unit,
   wherein the segment is capable of being a part of one group of pictures (GOP), a first frame of the one GOP is an I frame, and other frames of the one GOP are not an I frame.

2. The video distribution apparatus according to claim 1, wherein the generation unit reads the one or more of the frames from the holding unit and generates the segment by combining the one or more of the frames, and
   wherein the distribution unit adds to the segment generated by the generation unit header information about the segment and distributes the segment with the header information to the external apparatus.

3. The video distribution apparatus according to claim 1, wherein the segment is obtained by dividing one GOP into one group or a plurality of groups.

4. The video distribution apparatus according to claim 1, wherein the unit of a frame includes only one frame.

5. The video distribution apparatus according to claim 1, further comprising an image capturing unit configured to capture the video.

6. The video distribution apparatus according to claim 1, wherein the reception unit receives a request specifying the first type of the video stream from a first external apparatus and receives, from a second external apparatus which is different from the first external apparatus, a request specifying the second type of the video stream,
   wherein the generation unit generates the segment having the first length, and generates the segment having the second length, and
   wherein the distribution unit distributes the segment having the first length to the first external apparatus and distributes the segment having the second length to the second external apparatus.

7. A video distribution method which distributes video in a unit of a segment of the video, the segment of the video being a video file including one or more frames, the method comprising:
   holding video data in a unit of a frame;
   transmitting a Media Presentation Description file defining a first type of a video stream which is made up of segments having a first length and a second type of the video stream which is made up of segments having a second length longer than the first length;
   receiving, from an external apparatus, a request specifying one of the first type of the video stream and the second type of the video stream, selected by the external device;
   generating the segment having the first length in a case of receiving a request specifying the first type of the video stream, and generate the segment having the second length in a case of receiving a request specifying the second type of the video stream; and
   distributing the generated segment to the external apparatus,
   wherein the segment is capable of being a part of one group of pictures (GOP), a first frame of the one GOP is an I frame, and other frames of the one GOP are not an I frame.

8. A non-transitory computer-readable recording medium storing a program for executing a video distribution method which distributes video in a unit of a segment of the video, the segment of the video being a video file including one or more frames, the method comprising:
   holding video data in a unit of a frame;
   transmitting a Media Presentation Description file defining a first type of a video stream which is made up of segments having a first length and a second type of the video stream which is made up of segments having a second length longer than the first length;
   receiving, from an external apparatus, a request specifying one of the first type of the video stream and the second type of the video stream, selected by the external device;
   generating the segment having the first length in a case of receiving a request specifying the first type of the video stream, and generate the segment having the second length in a case of receiving a request specifying the second type of the video stream; and
   distributing the generated segment to the external apparatus,
   wherein the segment is capable of being a part of one group of pictures (GOP), a first frame of the one GOP is an I frame, and other frames of the one GOP are not an I frame.

* * * * *